June 24, 1969      R. O. CHAKROFF      3,451,698
COUPLING HAVING CONCENTRIC SPHERICAL SURFACES
SEALED BY LINE CONTACT Filed July 20, 1966      Sheet 1 of 3

INVENTOR.
RICHARD O. CHAKROFF
BY
Cox and Sheridan
ATTORNEYS

United States Patent Office 3,451,698
Patented June 24, 1969

3,451,698
COUPLING HAVING CONCENTRIC SPHERICAL SURFACES SEALED BY LINE CONTACT
Richard O. Chakroff, 298 Park Blvd.,
Worthington, Ohio 43085
Continuation-in-part of application Ser. No. 133,974,
Aug. 25, 1961. This application July 20, 1966, Ser.
No. 566,634
Int. Cl. F16l 27/04, 15/02, 19/00
U.S. Cl. 285—165                                 7 Claims

ABSTRACT OF THE DISCLOSURE

The application discloses coupling devices for joining together fluid conduits which may or may not have their longitudinal axes precisely aligned. The disclosed couplings each include a female clamping device, a male clamping device, and an intermediate coupling member which has its two faces formed as annular segments of spherical surfaces, both such spherical surfaces being concentric, and one such surface being a convex spherical surface and the other such surface being a concave spherical surface. The outer faces of the intermediate coupling members are in engagement with their associated female clamping devices at single lines of tangency, and the inner faces of the intermediate coupling members are in engagement with their associated male clamping devices at single lines of tangency. The engagement of the clamping devices with the intermediate coupling members may be through a sealing member consisting, as shown, of a metallic (preferably of a soft metal such as copper) or non-metallic O-ring.

---

This application is a continuation-in-part of application Ser. No. 133,974 filed Aug. 25, 1961, and now Patent No. 3,273,917, which latter application is a continuation in part of application Ser. No. 822,508 filed June 24, 1959 (now abandoned).

Background of the invention

This invention relates to coupling devices for joining fluid conduits, and particularly to coupling devices for joining together such fluid conduits without the necessity for precisely aligning the longitudinal axes of the conduits to be joined. The disclosure hereof includes features similar to features disclosed in said prior applications above referred to as well as additional improvements in combination therewith. The embodiments of my invention disclosed herein relate especially to mechanisms and methods for connecting together fluid conduits consisting of tubing, especially tubing of the type which is used for aircraft conduits.

The embodiments of my invention disclosed in this application show specifically members that are capable of readily joining together tubing such as aircraft conduits without the necessity of precisely aligning the longitudinal axes of the conduits to be joined, and without the necessity of precisely and accurately positioning longitudinally the ends of the conduits to be joined. Thus my couplings provide compensation for longitudinal misalignment, and take-up for longitudinal mismatch and for expansion or contraction of materials due to temperature changes.

In general, the coupling assembly of the present invention includes (1) a female clamping device; (2) a male clamping device; and (3) an intermediate coupling member which has an outer face or side of one end which is formed as an annular segment of an external spherical surface and has an inner face or side which is formed as an annular segment of an internal spherical surface. The outer face or side of the intermediate coupling member which is formed as an annular segment of an external spherical surface is in engagement with the female clamping member at a single line of tangency, and the inner face or side of the intermediate coupling member which is formed as an annular segment of an internal spherical surface is in engagement with the male clamping member at a single line of tangency.

Summary of the invention

In summary, the invention relates to a coupling assembly including a female clamping device, a male clamping device, and an intermediate coupling member clamped between the two and formed on its opposite faces with concentric segments of two spheres, one being a concave surface and the other a convex surface.

Each of the clamping devices has a circular line of contact which engages the spherical surfaces of the intermediate coupling member both on the outer face of the intermediate coupling member (which is as shown in the drawings a convex face) and on the inner face (which is as shown in the drawings a concave face), and so both of the contacting surfaces of the two clamping devices are urged into sealed engagement with the intermediate coupling member at a single line of tangency. It should be obvious that in referring to a single line of tangency, I do not use the word "line" in the sense it is used by mathematicians as having no width. The term "line" is used by me and others skilled in the coupling art to mean a line having some width. While a metal-to-metal line of contact would have a very narrow width, a line of contact between a resilient body such as a rubber O-ring and another body would at times when the resilient body is compressed have substantial width. The centers of the arcs of the two above mentioned spherical surfaces are coincident. Thereby substantial sliding engagement can occur between such spherical surfaces and the respective confronting surfaces or lines. This permits the clamping means to be drawn together into sealed relationship with the intermediate coupling member; notwithstanding possible misalignment of the longitudinal axes of the clamping members.

In the one embodiment, the coupling assembly provides in addition to the arrangements described in the last paragraph the formation of the opposite end of the clamping member as an assembly including a hollow cylinder or sleeve, and includes the provision of a hollow cylindrical member or sleeve which slides either within or over the hollow cylinder of the male member of the clamping device in fluid-tight relationship so as to provide takeup for longitudinal mismatch and to provide for expansion and/or contraction of the materials due to temperature changes.

It is an object of the present invention to provide a novel coupling assembly for joining conduits in fluid-tight or liquid-tight relationship, notwithstanding the fact that they are slightly misaligned and/or the fact that they are not positioned exactly at a definite longitudinal distance apart.

It is a further object of my invention to provide such a novel coupling assembly that can be manufactured as a satisfactory commercial device.

It is a further object of my invention to provide novel takeup arrangements for longitudinal mismatch and for longitudinal expansion and/or contraction of materials due to temperature changes and otherwise.

It is a further object of my invention to provide a novel fluid-tight relationship for a coupling device for joining together two lengths of tubings which are approximately aligned with each other but which may be slightly misaligned and/or which may be spaced from each other at varying distances.

Further objects and features of the invention will be apparent from the consideration of the following specification and claims when considered in connection with the accompanying drawings which illustrate embodiments of my invention.

Description of preferred embodiments

Figure 1:
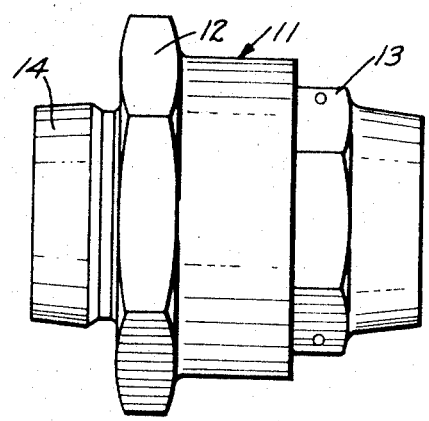
FIG. 1 is a view in side elevation of a coupling constructed according to my invention.

Referring in detail to the drawings, the coupling assembly of the embodiment of FIGS. 1, 2, 3, and 4 is designated 11 and includes a female clamping device 12, a male clamping device 13, and an intermediate coupling member 14. The intermediate coupling member 14 (see FIG. 4) is provided with a convex spherical surface 15 which is formed as an annular segment of an external spherical surface having its center at 16. It is formed on the inner side with a concave portion which is an annular segment of an internal spherical surface which is also formed from the center 16, the internal spherical surface being designated 17.

Figure 2:
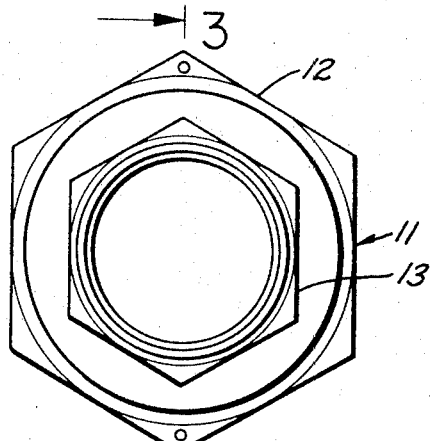
FIG. 2 is a view in end elevation of the coupling of FIG. 1.

It should be here pointed out that heretofore there have been proposed coupling assemblies having three coupling members, the outer two of which may be considered clamping members and the inner one of which may be considered an intermediate coupling member. However, in such coupling members there have not been provided external and internal spherical surfaces on the same member both having the same center. For example, in Park Patent 739,707, Park provides one member (flanged pipe member 1) having one side spherical and the other side flatly bevelled; in FIG. 1, he has another member (unflanged pipe member 2) flatly bevelled to contact the spherical end of the flanged pipe member; and has another member (coupling nut 10) having the contacting side spherical to seal with the flatly bevelled side of the first named member. In FIG. 2, he has a spherical surface on the end of pipe member 2 and a flat surface on nut 10.

Also, in said application Ser. No. 822,508, I have disclosed a coupling including (1) a male member of which one end has its outer face formed as an annular segment of a spherical surface, and (2) a female member having an outer surface formed as an annular segment of a spherical surface of which the center is coincident with the center of the spherical surface of the male member. Also, in my Patent No. 3,002,771 I disclose a coupling assembly including (1) a male coupling member, the outer side of the face of one end of which is formed as an annular segment of a spherical surface; (2) a female coupling member, the outer side of the face of one end of which is formed as an annular segment of a spherical surface; and (3) a clamping means. I have found by bitter experience, however, that though it is possible to make operative couplings following the procedures and teachings of said application Ser. No. 822,508 and said Patent 3,002,771, yet it is impractical from a commercial standpoint to do so because it is economically impossible to hold a common center in the manufacture of two spaced parts in an assembled coupling.

In the some 60 years since the Park patent was filed, designers have apparently been unable to accomplish a suitable high pressure coupling constructed according to the Park patent. One reason for this is that while it is possible with machine tools in existence to maintain a spherical surface with a definite center line on a single element held in a lathe, when this element is machined and removed and a second element placed in the lathe, a maintenance of a single center becomes extremely difficult if not impossible. A cutting edge generating a spherical cut may be provided, but since the center of rotation of the cutting edge does not coincide with the center line of the lathe stock, a spherical section is generated which is not the same as the segment of a perfect spherical section. Because of the involved procedure in achieving a perfect sphere, most commercial items are not spherical. Now I have discovered that by placing both the concave and the convex spherical surface on a single part and by placing this part intermediate the clamping surfaces, it is possible to achieve exact spherical surfaces about a coincident center and it is possible to join together the members without even the necessity of precisely aligning the longitudinal axes of the conduits to be joined.

The coupling member 14 of the embodiment shown in FIGS. 1–4 inclusive is, as previously pointed out, provided with an internal spherical surface 17 formed from the center 16. This spherical surface has a radius $R_1$ from said center 16. The male clamping member 13 of the embodiment shown in FIGS. 1–4, inclusive, includes an end portion which is provided with a surface 18 in contact with the spherical surface 17 of the intermediate coupling member 14. The surface 18 is radiused for a single point contact. It is shown as a rounded surface, but it may be cylindrically or spherically convex having a smaller diameter than the diameter of the spherical surface 17, or it may be a sharp corner. At all events, the contact of the surface 18 with the spherical surface 17 is in engagement at a single line of tangency.

With continued reference to FIGURES 1, 2, 3 and 4, the outer side of the intermediate member 14 includes a spherical surface 15 having a radius $R_2$ originating at the same center 16 as the previously mentioned radius $R_1$ of the spherical surface 17 on the inner side of the coupling member 14.

Figure 3:
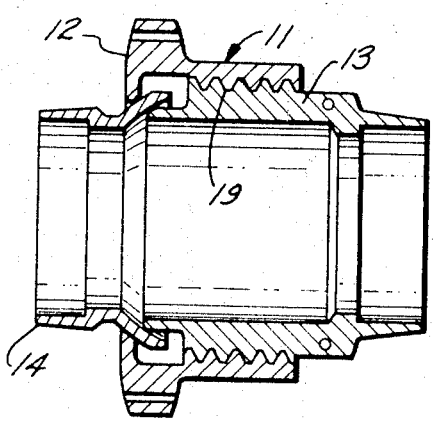
FIG. 3 is a view in vertical section of the coupling of FIGS. 1 and 2, shown on the line 3—3 of FIG. 2.
Figure 4:
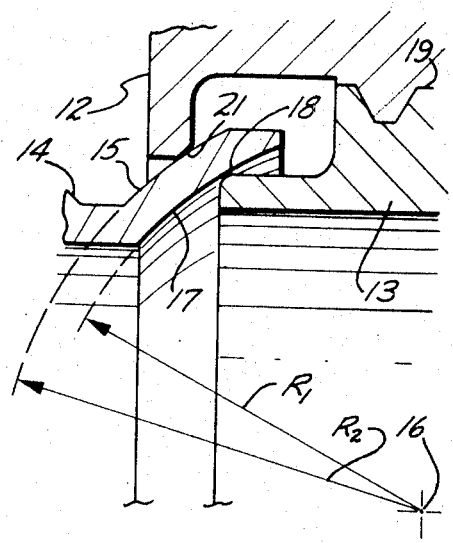
FIG. 4 is an enlarged fragmentary view of a portion of FIG. 3 illustrating the fact that the operative faces of the intermediate coupling members are formed as segments of spheres having a common center.

One of several types of possible clamping means is illustrated in FIG. 3 at 12 and 13. This particular type of clamping means includes the female clamping member 12 in threaded engagement with the male clamping member 13 by means of threads 19. Clamping means 12 includes an inwardly facing surface 21 in engagement with the spherical surface 15 on the outer side of the intermediate member 14. Thus it is apparent that tightening of the clamping device 12 with the clamping device 13 urges the surface 21 into engagement with spherical surface 15, and spherical surface 17 into engagement with the surface 18. Surface 21, like surface 18, is preferably conical for simplicity and economy of manufacture, but can be of any configuration previously described for surface 18 as long as the surfaces meet at a single line of tangency.

The coupling portions of the present invention can be formed of any suitable material without departing from the spirit of the present invention. It should also be pointed out that although the fastening means illustrated comprising clamping devices 12 and 13 is threaded types of clamping means such as bevelled flange types and clamp-ring types and bolted flange (all well known to those familiar in the art) can be utilized without departing from the spirit of the present invention.

In operation, assuming that a fluid conduit or aircraft tubing is connected to the outer end of, and aligned with, the intermediate coupling member 14 and is either exactly aligned with or slightly misaligned from another fluid conduit or aircraft tubing which is connected to the outer end of and aligned with the male clamping member 13, the longitudinal axis of intermedite member 14 will of course be aligned with or slightly misaligned from (as the case may be) the longitudinal axis of the male clamping member 13. If such misalignment is present, it causes the surface 18 on the clamping member 13 to move along the spherical surface 17 of the intermediate member 14 in constant contacting engagement therewith. Similarly, spherical surface 15 on the intermediate member 14 moves along the conical surface 21 in constant contacting engagement therewith. Hence, when coupling means 12 and 13 are tightened by means of the screw threads 19, all of the surfaces will be urged snugly together in sealed relationship notwithstanding the fact that the longitudinal axis of the intermediate coupling member 14 and the conduit connected thereto are misaligned with the longitudinal axis of the male clamping member and the conduit connected thereto.

It is understood, as suggested above, that the male coupling member 14 is secured to and sealed with a fluid containing tube which has its axis aligned with the axis of the clamping member 13, and that the intermediate coupling member 14 is secured to and sealed with fluid containing tube which has its axis aligned exactly with the axis of the coupling member 14.

Figure 5:
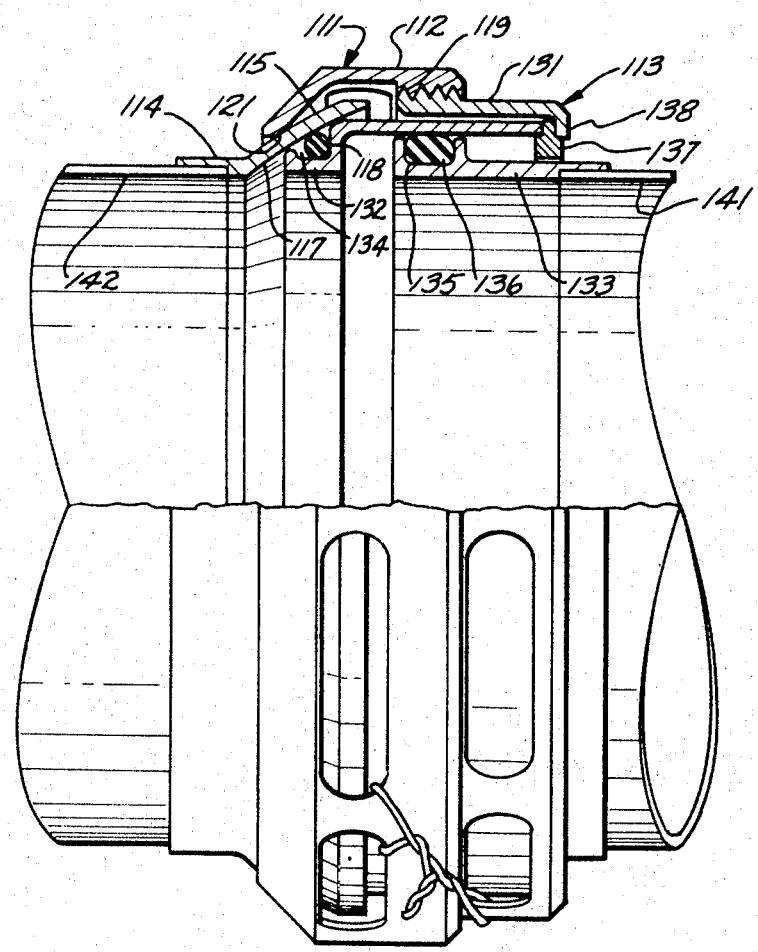
FIG. 5 is a view of a modified form of coupling shown partly in elevation and partly in vertical section and shown on a larger scale.

Referring now to FIG. 5, it may be seen that I have shown a similar coupling arrangement in which the parts are designated by the same numerals as the parts of FIGURES 1, 2, 3, and 4, with the addition of 100. Thus there is shown a coupling 111 consisting of a female clamping device 112, a male clamping device 113, and an intermediate coupling member 114. The intermediate coupling member 114 has external spherical surface 115 and an internal spherical surface 117, the surfaces 115 and 117 having a common center. However, the clamping device 113 consists of several parts. It consists of a threaded clamping member 131, a sealing member 132, and sliding member 133 for connection with a fluid conduit or aircraft tubing. The clamping member 112 is formed with an inner surface 121 which may be conical or flat, or other appropriate shape. The sealing member 132 is formed preferably of brass or bronze and is formed with a pocket 134 in which there is placed a sealing member 118 which accomplishes the same function as the corresponding surface 18 of clamping member 13 FIGS. 1, 2, 3, and 4. The member 133 is formed preferably of stainless steel and is formed with a pocket 135 in which there is placed a sealing ring 136 for purposes presently to be described. A ring or washer 137 preferably of brass or bronze may be provided, if desired, intermediate the member 131 and the member 132, and if provided is so positioned and formed that clamping of the parts together by means of the threads 119 of the members 112 and 131 acts through the flange 138 to force the ring or washer 137 against the end of the member 132 thus moving the sealing member 118 into line contact with the spherical inner surface of the member 114 and sealing with said surface by a line contact. The sealing member 118 may be metallic or non-metallic. In one case I use a soft copper ring which is rectangular in cross section. In other cases, I use a non-metallic O-ring.

In assembling the structure shown in FIG. 5, the parts 112, 114, 131, 132, 133 and 137 are assembled first without the O-ring 118 and are tightened until the metal parts are in handtight engagement. The rotational correspondence of members 112 and 131 is marked. The parts are disassembled, the O-ring is inserted and the parts are reassembled, but are tightened only to a point a fraction of an inch from the alignment marked so that the metal parts do not contact and so that the O-ring (which exactly fits in the recess) is completely relaxed, maintains its circular shape and contacts the spherical surface 117 at a single line of tangency.

Figure 6:
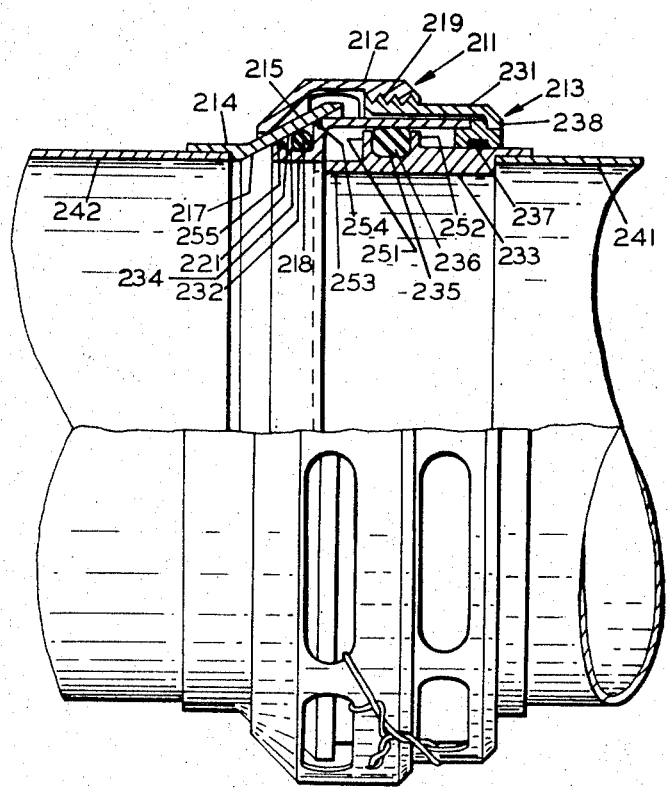
FIG. 6 is a view similar to FIG. 5 showing a further modification.

The embodiment shown in FIG. 6 is similar to the embodiment shown in FIG. 5. Therein the parts are designated by the same numerals as the parts of FIG. 5 with the addition of 100. Thus there is shown a coupling 211 consisting of a female clamping device 212, a male clamping device 213 and an intermediate coupling member 214. The intermediate coupling member 214 has an external spherical surface 215 and an internal spherical surface 217, the surfaces 215 and 217 having a common center. The clamping device 213 consists of several parts. It consists of a threaded clamping member 231, a sealing member 232 and a sliding member 233 for direct connection with a fluid conduit of aircraft tubing 241. The clamping member 212 is formed with an inner surface 221 which may be conical or flat or other appropriate shape. The sealing member 232 is formed with a pocket 234 in which there is placed a sealing member 218 (similar to the sealing member 118 above described). The member 233 is formed with a pocket 235 in which there is placed a sealing ring 236 for purposes similar to those of the sealing ring 136 above described.

A ring or washer 237 is provided intermediate the member 231 and the member 232 and is so positioned and formed that the clamping of the parts together by means of the threads 219 of the members 212 and 231 acts through a flange 238 to force the ring 237 against the end of the member 232, thus moving the sealing member 218 into contact with spherical inner surface of the member 214 and sealing with said surface by substantially a line contact.

The ring or washer 237 as shown in FIG. 6, is formed with a wider base than the ring 137 as shown in FIG. 5. The width of the base is appreciably greater than the height of the ring 237 thus giving a much greater bearing surface. I have demonstrated by trigonometry that the increase in the bearing surface of the ring 237 increases proportionately the critical distance between the base of said ring 237 and the member 233 while insuring against contact of the prongs 251 and 252 of the pocket 235 with the inner surface of the sealing member 232. Such contact is highly undesirable because of wear and consequent leakage at the contacting points. Increase of the allowable distance between the base of the ring 237 and member 233 is quite advantageous because of the machining tolerances required at this point. The base of the washer 237 may, if desired, be formed with a groove such as groove 237a. This groove is only provided, however, for the purpose of lightening the weight of the washer.

Also to increase the critical distance between the base of the ring 237 and the member 233, I have extended the member 233 so that the lip 253 rides under the coupling member 214 thus increasing very very greatly the effective length of the bearing surface on the exterior of member 233.

I also have added anti-scratch nonmetallic rings at points 254 and 255 where sealing member 232 might contact coupling member 214.

The operation of this embodiment is the same as the operation of the embodiment illustrated in FIG. 5.

Aircraft tubing 241 and 242 are secured in fluid-tight relationship with clamping members 213 and intermediate coupling member 214 respectively as shown.

I claim:
1. A coupling assembly for connecting in fluid tight relationship a pair of generally oppositely extending fluid conduits notwithstanding possible longitudinal misalignment of said fluid conduits, comprising:
   a pair of tubular clamping devices one of which is a female clamping device and the other of which is a male clamping device, one of which devices is formed with an annular groove;
   a first sealing ring in said groove;
   an intermediate tubular coupling member, clamped between said clamping devices, having an outer face formed as an annular segment of an external spherical surface which engages one clamping device, having an inner face formed as an annular segment of an internal spherical surface which engages the other clamping device, and said spherical surfaces being concentric;

said sealing ring and said clamping device which does not have said groove therein each engaging one of said spherical surfaces at a single line of tangency; and means to retain the clamping devices in clamping position.

2. A coupling assembly according to claim 1 in which the male clamping device is formed with the annular groove and has the sealing ring therein which engages the internal spherical surface of the intermediate coupling member and the female clamping member engages the external spherical surface of the intermediate member at a single line of tangency.

3. An assembly comprising:
a pair of generally oppositely extending fluid conduits connected in fluid tight relationship notwithstanding possible longitudinal misalignment of said fluid conduits;

a pair of tubular clamping devices one of which is a female clamping device and the other of which is a male clamping device comprising an externally threaded member, a washer on which said threaded member bears, an elongated packing holder also bearing on said washer, and a packing secured in said packing holder, and one of said clamping devices being connected in fluid tight sealed relationship with one of said fluid conduits;

an intermediate tubular coupling member, clamped between said clamping devices, having an outer face formed as an annular segment of an external spherical surface which engages the female clamping member at a single line of tangency, having an inner face formed as an annular segment of an internal spherical surface which is concentric with the external spherical surface of the outer face and which engages the packing at a single line of tangency and is secured in fluid tight sealed relationship with the other of said fluid conduits; and cooperating means for securing said clamping devices adjustably to each other to clamp the intermediate coupling member between them.

4. The structure of claim 3 in which the packing is a soft metallic ring having a circular cross section and engaging the concave surface of the intermediate coupling member with a line contact.

5. A coupling assembly for connecting in fluid tight relationship a pair of generally oppositely extending fluid conduits notwithstanding possible longitudinal misalignment of said fluid conduits, comprising:
a pair of tubular clamping devices one of which is a female clamping device and the other of which is a male clamping device, one of which devices is formed with an annular groove;

a first sealing ring in said groove;

an intermediate tubular coupling member, clamped between said clamping devices, having an outer face formed as an annular segment of an external spherical surface which engages one clamping device, having an inner face formed as an annular segment of an internal spherical surface which engages the other clamping device, and said spherical surfaces being concentric;

said sealing ring and said clamping device which does not have said groove therein each engaging one of said spherical surfaces at a single line of tangency; wherein:

the intermediate tubular coupling member is secured to one of said fluid conduits forward of said coupling; and in which the male clamping device comprises an exteriorly threaded clamping member formed as a sleeve with a radially inwardly extending flange adjacent its longitudinally outer end;

a circular washer positioned within said threaded clamping member and forward of said flange and on which said flange bears;

means securing said washer within said exteriorly threaded clamping member;

a longitudinally extending annular sealing member positioned forward of said circular washer and radially inward of said exteriorly threaded clamping member and formed with said annular groove;

said sealing member being provided with a longitudinally extending cylindrical interior surface;

means on said male and female clamping devices and said sealing member maintaining said intermediate member in engagement at said single line of tangency with said first sealing ring and said clamping device which does not have said groove;

a sliding member consisting of an annular longitudinally extending sleeve positioned radially inward of said annular sealing member and said washer and formed with an exterior annular pocket, the base of the washer bearing on the exterior of said sleeve throughout a longitudinal distance which is greater than the radial height of said washer; and a second ring positioned in said pocket and bearing on the said cylindrical surface of said annular sealing member and said other fluid conduit secured to said sliding member, said sliding member, sealing member, and washer being all so constructed and arranged that said sliding member may move longitudinally of said sealing member and said washer and that during said longitudinal movement said washer maintains said sliding member in longitudinal alignment with said sealing member.

6. A coupling assembly for connecting in fluid tight relationship a pair of generally oppositely extending fluid conduits notwithstanding possible longitudinal misalignment of said fluid conduits comprising:
a pair of tubular clamping devices one of which is a female clamping device and the other of which is a male clamping device, one of which devices is formed with an annular groove;

a first sealing ring in said groove;

an intermediate tubular coupling member, clamped between said clamping devices, having an outer face formed as an annular segment of an external spherical surface which engages one clamping device, having an inner face formed as an annular segment of an internal spherical surface which engages the other clamping device, and said spherical surfaces being concentric;

said sealing ring and said clamping device which does not have said groove therein each engaging one of said spherical surfaces at a single line of tangency; wherein:

the male clamping device comprises an exteriorly threaded clamping member formed as a sleeve with a radially inwardly extending flange adjacent its longitudinally outer end;

a circular washer positioned within said threaded clamping member longitudinally inward of said flange and on which said flange bears;

an annular sealing member positioned longitudinally inward of said circular washer and radially inward of said exteriorly threaded clamping member and formed with said annular groove, said sealing member bearing against said circular washer maintaining said circular washer against said flange;

a sliding member consisting of an annular sleeve positioned radially inward of said annular sealing member and said washer and formed with an exterior annular pocket, the base of the washer bearing on the exterior of said sleeve throughout a longitudinal distance which is greater than the radial height of said washer, and said sliding member having a longitudinally extending lip extending within and bearing on a portion of said annular sealing member;

means maintaining said sliding member in contact with said sealing member;

a sealing ring sealingly positioned in said pocket and sealingly bearing on the interior surface of said annular sealing member; and means on said female clamping device co-acting with said exteriorly threaded clamping member and said sealing member maintaining said intermediate member in engagement at a single line of tangency.

7. A coupling assembly for connecting in fluid tight relationship a pair of generally oppositely extending fluid conduits notwithstanding possible longitudinal misalignment of said fluid conduits comprising a pair of tubular clamping devices one of which is a female clamping device and the other of which is a male clamping device, one of which devices is formed with an annular groove;

a first sealing ring in said groove;

an intermediate tubular coupling member, clamped between said clamping devices, having an outer face formed as an annular segment of an external spherical surface which engages one clamping device, having an inner face formed as an annular segment of an internal spherical surface which engages the other clamping device, and said spherical surfaces being concentric;

said sealing ring and said clamping device which does not have said groove therein each engaging one of said spherical surfaces at a single line of tangency; wherein:

the intermediate tubular coupling member is secured to one of said fluid conduits forward of said coupling;

the male clamping device comprises an exteriorly threaded clamping member formed as a sleeve with a radially inwardly extending flange adjacent its longitudinally outer end;

a circular washer positioned within said threaded clamping member and forward of said flange and on which said flange bears;

a longitudinally extending annular sealing member positioned forward of said circular washer and radially inward of said exteriorly threaded clamping member and formed with said annular groove;

said sealing member being provided with a longitudinally extending cylindrical interior surface;

means maintaining said flange bearing on said washer and said intermediate coupling member in engagement at said single line of tangency with said first sealing ring and said clamping device which does not have said groove;

a sliding member consisting of an annular longitudinally extending sleeve positioned radially inward of said annular sealing member and said washer and formed with an exterior annular pocket, the base of the washer bearing on the exterior of said sleeve throughout a longitudinal distance which is greater than the radial height of said washer; and a second sealing ring positioned in said pocket and bearing on the said cylindrical surface of said annular sealing member and said other fluid conduit secured to said sliding member, said sliding member, sealing member, and washer being all so constructed and arranged so that said sliding member may move longitudinally of said sealing member and said washer but remaining in contact with said washer.

References Cited

UNITED STATES PATENTS

| | | | |
|---|---|---|---|
| 954,549 | 4/1910 | Turner | 285—332.3 |
| 1,597,214 | 8/1926 | Stenning | 285—334.4 X |
| 2,025,113 | 12/1935 | Laurent | 285—261 |
| 2,511,158 | 6/1950 | Gray | 285—269 X |
| 2,511,495 | 6/1950 | Crot | 285—164 X |
| 2,837,360 | 6/1958 | Ladd. | |
| 2,918,313 | 12/1959 | Lazar et al. | 285—261 X |

FOREIGN PATENTS

| | | |
|---|---|---|
| 1,006,009 | 1/1952 | France. |
| 590,003 | 7/1947 | Great Britain. |
| 474,963 | 10/1952 | Italy. |

CARL W. TOMLIN, *Primary Examiner.*

D. W. AROLA, *Assistant Examiner.*

U.S. Cl. X.R.

285—263, 271, 302, 347

PO-1050
(5/69)

UNITED STATES PATENT OFFICE
CERTIFICATE OF CORRECTION

Patent No. 3,451,698      Dated June 24, 1969

Inventor(s) Richard O. Chakroff

It is certified that error appears in the above-identified patent and that said Letters Patent are hereby corrected as shown below:

Column 4, line 67,    "is threaded" should read --- is of threaded type, other ---.

Column 5, line 21,    "coupling member 14" should read --- clamping member 13 ---;

line 24,    "with fluid" should read --- with a fluid ---.

SIGNED AND
SEALED

SEP 3 0 1969

(SEAL)
Attest:

Edward M. Fletcher, Jr.
Attesting Officer

WILLIAM E. SCHUYLER, JR.
Commissioner of Patents